United States Patent
Kitamura et al.

[11] Patent Number: 5,187,846
[45] Date of Patent: Feb. 23, 1993

[54] PALLET CHANGER

[75] Inventors: Koichiro Kitamura; Shigeru Yamada, both of Takaoka, Japan

[73] Assignee: Kitamura Machinery Co., Ltd., Japan

[21] Appl. No.: 722,327

[22] Filed: Jul. 2, 1991

[30] Foreign Application Priority Data

Jul. 12, 1990 [JP] Japan .................. 1-182745

[51] Int. Cl.$^5$ .................. B23Q 5/22; B65G 35/00
[52] U.S. Cl. .................. 29/33 P; 198/619
[58] Field of Search .................. 29/33 P, 563, 741; 198/346.1, 346.2, 345.3, 619; 104/23.2

[56] References Cited

U.S. PATENT DOCUMENTS

| | | |
|---|---|---|
| 4,627,362 | 12/1986 | Ise et al. .................. 104/23.2 |
| 4,662,282 | 5/1987 | Fukunatari .................. 104/23.2 X |
| 4,704,792 | 11/1987 | Itagaki et al. .................. 29/741 |
| 4,714,155 | 12/1987 | Watanabe et al. .................. 198/619 |
| 4,718,539 | 1/1988 | Fukunatari et al. .................. 198/619 |

FOREIGN PATENT DOCUMENTS

| | | | |
|---|---|---|---|
| 89131 | 7/1980 | Japan .................. | 198/619 |
| 419015 | 8/1974 | U.S.S.R. .................. | 198/619 |

Primary Examiner—William Briggs
Attorney, Agent, or Firm—Lorusso & Loud

[57] ABSTRACT

A pallet changer includes at least one pallet (4, 14) for holding a workpiece (5, 15); a first guide (41) for guiding the pallet (4, 14); a first support (2) for supporting the first guide (41); a second guide (51) for guiding the pallet (4, 14); a second support (30) for supporting the second guide (51); a first linear motor (40) associated with the first guide (41); a second linear motor (50) associated with the second guide (51). The pallet (4, 14) is made of conductive material so as to serve as a secondary conductor for the first linear motor (40) and the second linear motor (50) for performing changing of the pallet (4, 14) between the first linear motor (40) and the second linear motor (50) along a desired direction (Y).

11 Claims, 4 Drawing Sheets

PALLET CHANGER

BACKGROUND OF THE INVENTION

This invention relates to a pallet changer for performing pallet loading and unloading operations between a table of a machine tool and a pallet support means for storing a plurality of pallets.

Generally speaking, a conventional pallet changer is designed to load a pallet with a work to be machined from a pallet support means to a table of a machine tool and to unload the pallet with the machined work from the table to the pallet support means. After the pallet loaded from the pallet support means is fixed to the table of the machine tool by means of a clamping device, a desired machining operation of the work set on the pallet is performed with the machine tool.

In the conventional pallet changer, a loading and unloading mechanism having a hydraulic cylinder or a transfer mechanism having a motor and a chain is used for performing the pallet loading and unloading operations between the pallet support means and the table of the machine tool.

However, in said conventional loading and unloading mechanism or said transfer mechanism, at least an engaging and unengaging mechanism including a pallet hook fixed to the pallet and an engaging member fixed to an actuating means for engaging the pallet hook is required. Therefore, the loading and unloading means is complex in structure. Furthermore, it is impossible to quickly perform the pallet changing operation because the engaging and unengaging operations are required. Also, it is impossible to perform high-speed loading and unloading operations.

SUMMARY OF THE INVENTION

The object of this invention is to provide a pallet changer which can be constructed in a simple manner so as to perform high-speed loading and unloading operations, that is, to quickly perform a pallet changing operation.

According to this invention, a pallet changer comprises at least a pallet for holding a work; a first guide means for guiding the pallet; a first support means for supporting the first guide means; a second guide means for guiding the pallet; a second support means for supporting the second guide means; and a first linear motor provided with the first guide means; a second linear motor provided with the second guide means. The pallet is made of conductive material so as to serve as a secondary conductor for the first linear motor and the second linear motor for performing pallet changing operation of the pallet between the first linear motor and the second linear motor along a desired direction.

BRIEF DESCRIPTION OF EMBODIMENT

Figure 1:
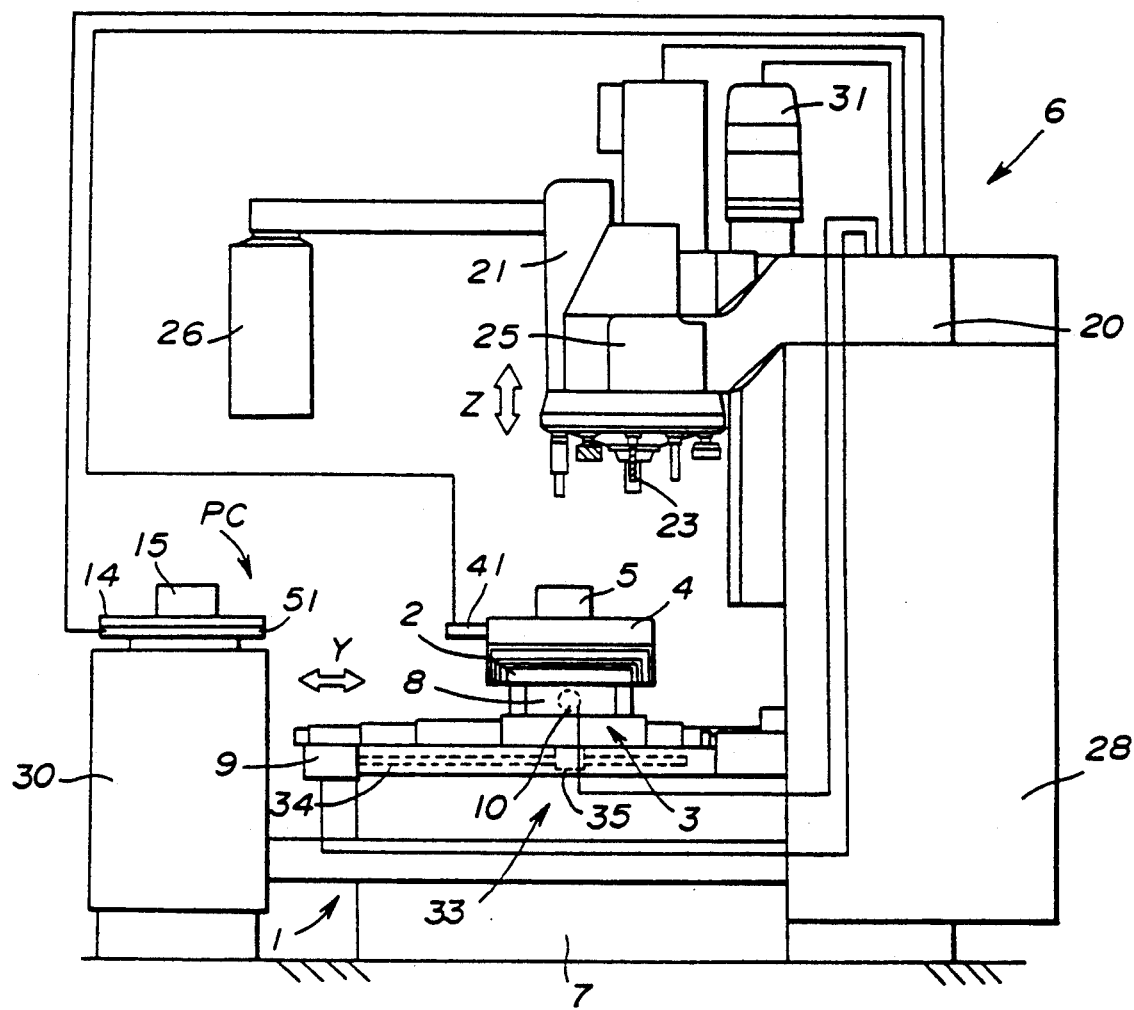
FIG. 1 is a side view showing a machining center which has a pallet changer according to this invention.
Figure 3:
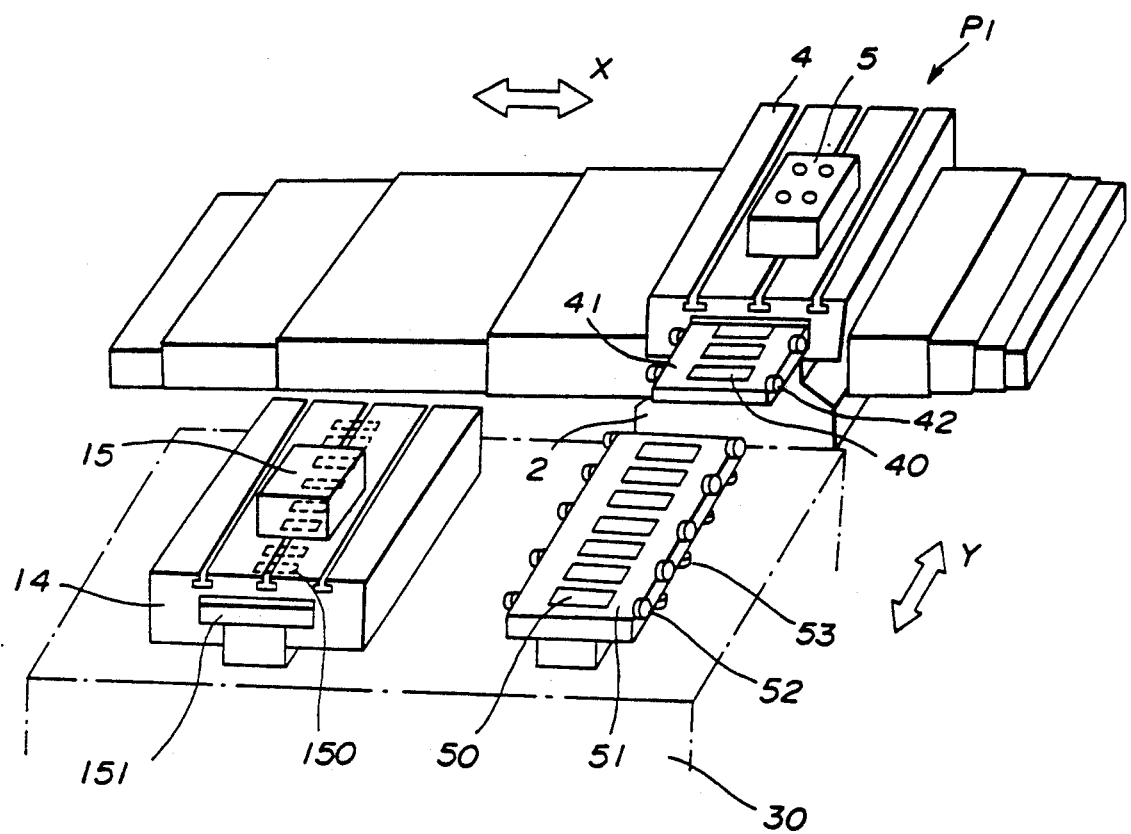
FIG. 3 is a perspective view showing a pallet support and a table.

Referring to FIG. 1, an embodiment of a pallet changer according to this invention is designed to perform loading and unloading of pallets 4, 14 between a table 2 of a machining center 6 and a pallet support 30. In FIG. 3, the tabel 2 is provided with a first linear motor (as a primary coil) 40, while the pallet support 30 is provided with second and third linear motors 50, 150. Each of the pallets 4, 14 serves as a secondary conductor for the first to third linear motors 40, 50 and 150. The first linear motor 40 provided on the table 2 is designed or arranged in such a manner that the first motor 40 can be aligned with the second linear motor 50 or the third linear motor 150, that is, each of the linear motors 40, 50, 150 is alignable in a Y-direction. Therefore, by moving the table 2 in a X-direction along a first predetermined distance, the first linear motor 40 on the table 2 is aligned with the second linear motor 50 in the Y-direction, while by moving the table 2 along a second predetermined distance, the first linear motor 40 on the table 2 is aligned with the third linear motor 150 in the Y-direction. For example, the pallet 4 can be moved along the Y-direction by operating the first and second linear motors 40 and 50.

DETAILED DESCRIPTION OF EMBODIMENT

Figure 2:
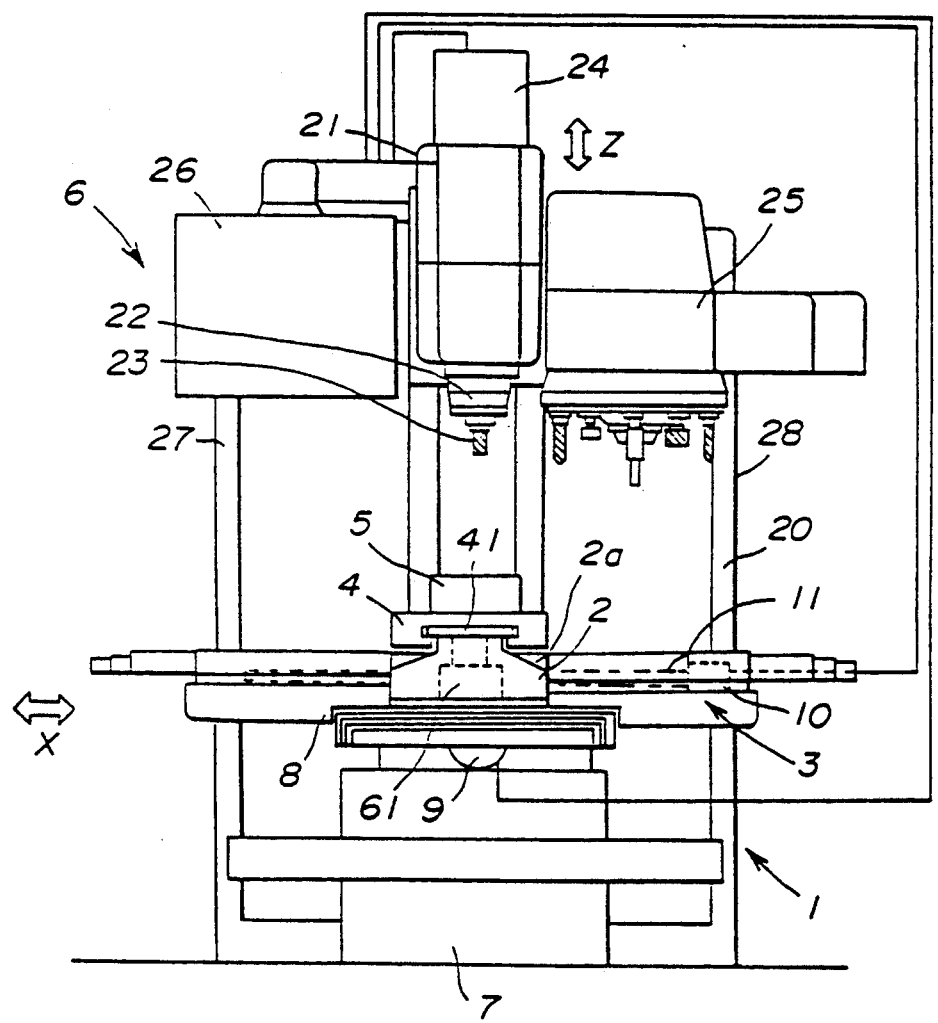
FIG. 2 is a front view showing the machining center.

FIG. 1 shows a vertical machining center 6 with a pallet changer PC according to this invention. FIG. 2 is a front view of the machining center from the view point of the pallet support. In FIG. 2, the pallet support 30 is not shown for simplification.

A support body 1 comprises a bed 7 and a saddle 8. The bed 7 is provided with a servomotor 9 for producing a Y-axis feed motion of the saddle 8.

A drive means 3 is provided with a servomotor 10 for producing a X-axis feed motion and a feedscrew means 11. The table 2 is provided on the saddle 8. The pallet 4 is detachably set on the table 2 and slidably moved thereon along the Y-axis.

A column 20 of the machining center 6 is provided with a spindlehead 21. A tool 23 is attached in a spindle 22 of the spindlehead 21. The spindle 22 is rotated by a motor 24. The spindlehead 21 is equipped with an automatic tool changer 25, while the column 20 is equipped with an operation panel 26, a computer numerical control unit 27, and a control panel unit 28.

The table 2 can be moved in the X-axis by the servomotor 10. The pallet support 30 is placed near the support body 1. The pallet support 30 is provided with a pallet 14 thereon.

The output shaft of the servomotor 9 is connected to a feedscrew 34 of a ball screw unit 33. The feedscrew 34 engages a nut 35 which is fixed to the underside of the saddle 8 to move the saddle 8 along the Y-axis by the servomotor 9.

The spindlehead 21 can be vertically moved along a Z-axis by a servomotor 31.

Figure 4:
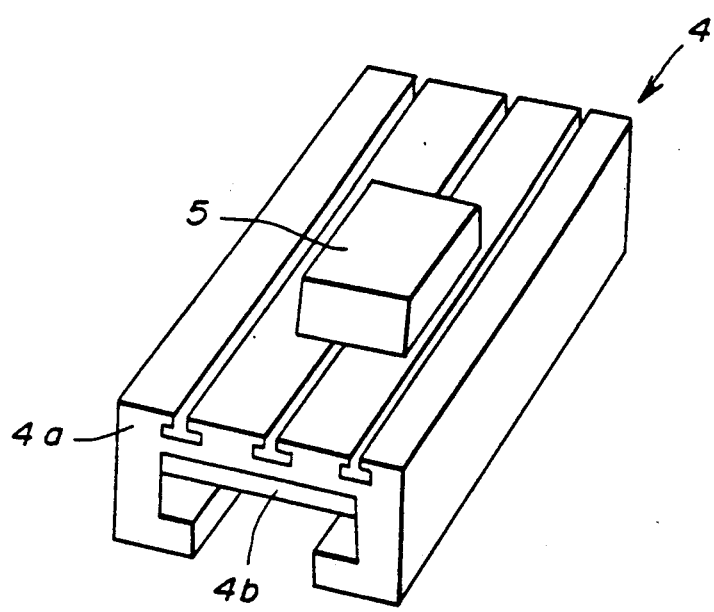
FIG. 4 is a perspective view showing a preferred pallet with a workpiece thereon.

Next, a transfer mechanism or a loading and unloading mechanism for the pallets according to FIGS. 3 and 4 will be explained hereinafter.

Each of the pallets 4, 14 which is identical in shape to a conventional pallet has two lower legs and slots for attaching the work on the upper side of the pallet. In this case, pallet hooks are not required. The pallet 4 comprises a pallet body 4a made of iron and a member 4b made of aluminium, so as to provide a secondary conductor for linear motors which are explained hereinafter. The invention is not limited to the pallet as shown in Figures in shape or in material. The pallet should be designed to serve as a secondary conductor. The workpieces 5, 15 are fixed on the pallets 4, 14, respectively.

The table 2 has a planer guide member 41. A linear motor (primary coil) 40 is arranged along the Y-axis on the guide member 41.

As shown in FIG. 2, a cylinder piston means 61 is arranged under the guide member 41. When the guide member 41 is moved vertically up to an upper position by actuating the cylinder piston means 61 in case of performing loading or unloading operation, the guide member 41 is unclamped in the upper position to allow the pallet to move along the Y-axis. Also, in case of machining the work on the table 2, the pallet 4 is supported in a clamped manner to receiving portions by moving the guide member 41 downwardly to a lower position.

Both upper sides of the guide member 41 are provided with rollers 42. The underside of the pallet 4 is supported by the rollers 42, while the two legs of the pallet 4 are guided along both sides of the guide member 41. This allows the pallet 4 to move smoothly along the Y-axis by the action produced by the linear motor. If the pallet can be spaced from the guide member, no guide roller is required.

Two guide members 51, 151 are arranged along the Y-axis on the pallet support 30. The linear motors (primary coil) 50, 150 are arranged on the guide members 51, 151, respectively, and parallel to the Y-axis. Both sides of the guide member 51 are provided with rollers 52, 53 so as to smoothly move the pallet 4 or 14. As the vertical height of each of the guide members 51, 151 is equal to that of the guide member 41 when positioning the guide member 41 in the upper position, for example, the guide member 41 can be aligned with the guide member 51 after moving the guide member 41 along the first desired distance.

The linear motors 50, 150 and 40 may be controlled not only when an operator operates the operation panel 26, but also may be automatically controlled by a prestored program after machining operation. In this case the moving operation of the table 2 and the pallet transfer operation can be automatically performed.

Next, the operation of the pallet changer will be explained.

After performing the desired machining of the work 5 such as drilling by the tool 23, the guide member 41 of the table 2 is moved to a predetermined position P1 (cf. FIG. 3), corresponding to the guide member 51 positioned in the right side of the pallet support 30, along the X-axis and Y-axis, by the servomotors 10 and 30.

Next, by actuating the cylinder piston 61, the pallet 4 is supported unclamped while the guide member 41 is moved up to the upper position so as to align the guide member 41 with the guide member 51. Therefore, the guide member 41 is in alignment with the guide member 51 and level in height. The pallet 4 is moved from the guide member 41 to the guide member 51 along the Y-axis by actuating the linear motors 40, 50. The unloading operation of the pallet 4 from the table 2 to the pallet support 30 it thus performed.

Next, the table 2 in FIG. 3 is moved to the left to align the table 2 with the guide member 151 set on the left portion of the pallet support 30. The pallet 14 is moved from the guide member 151 to the guide member 41 by actuating the linear motors 150 and 40. After the pallet 14 is moved to the desired position on the guide member 41, the guide member 41 is moved downwardly to clamp the pallet 14 to the table 2. The loading operation of the pallet 14 from the pallet support 30 to the table 2 is thus performed.

This invention is not limited to the above-mentioned embodiment. For example, a pallet support may be constructed as a pallet station having an endless self-feeding conveyor. In addition, the table 2 may be provided with a positioning pin so for insertion into a hole formed in the pallet for increasing the positioning accuracy of the pallet with respect to the table 2. Furthermore, the machine tool with a pallet changer according to this invention may be used with various machines such as a horizontal machining center and so on.

According to this invention, the high-speed loading and unloading of a pallet can be performed by driving power produced by the linear motors. Also, as a mechanism including means such as a hook or the like for engaging or disengaging the pallet is not required, the pallet to be loaded or unloaded can be constructed in a simple manner and the pallet changing operation can be quickly performed.

What is claimed is:

1. A pallet changer system comprising:
    at least one pallet for holding a workpiece;
    first guide means for receiving and holding said pallet;
    first support means for supporting said first guide means;
    second guide means for receiving and holding the pallet;
    second support means for supporting said second guide means;
    a first linear motor carried by said first guide means; and
    a second linear motor carried by said second guide means;
    wherein said one pallet is made of a conductive material so as to serve as a secondary conductor for the first linear and second linear motors for pallet changing between said first and second guide means in a first direction; and wherein said first support means comprises moving means for moving said first guide means in a second direction perpendicular to said first direction so as to align said first linear motor with said second linear motor.

2. A pallet changer in accordance with claim 1 further comprising:
    third guide means for receiving and holding said one pallet said third guide means being supported by said second support means, and
    a third linear motor carried by said third guide means.

3. A pallet changer in accordance with claim 1, wherein said first support means is a table on a vertical machining center comprising a spindlehead having a spindle for attaching a tool and movable in a third direction perpendicular to said first and second directions.

4. A pallet changer in accordance with claim 2, wherein each of the first, second and third linear motors is constructed as a primary coil.

5. A pallet changer in accordance with claim 1, wherein each of the first and second guide means comprises roller means for smoothly transferring the pallet.

6. A pallet changer in accordance with claim 1, wherein said one pallet comprises:
    a pallet body made of iron; and
    a member made of aluminum and fixed to the underside of said pallet body for facing one of said linear motors.

7. A pallet changer system comprising:
    at least one pallet for holding a workpiece;

first guide means for receiving and holding said pallet;

first support means for supporting said first guide means;

second guide means for receiving and holding the pallet;

second support means for supporting said second guide means;

a first linear motor carried by said first guide means; and a second linear motor carried by said second guide means;

wherein said one pallet is made of a conductive material so as to serve as a secondary conductor for the first linear and second linear motors for pallet changing between said first and second guide means in a first direction, and wherein said first support means is a table on a vertical machining center comprising a spindlehead having a spindle for attaching a tool and movable in a second direction perpendicular to said first direction.

8. A pallet changer system comprising:

at least one pallet for holding a workpiece;

first guide means for receiving and holding said pallet;

first support means for supporting said first guide means;

second guide means for receiving and holding the pallet;

second support means for supporting said second guide means;

a first linear motor carried by said first guide means; and a second linear motor carried by said second guide means;

wherein said one pallet is made of a conductive material so as to serve as a secondary conductor for the first linear and second linear motors for pallet changing between said first and second guide means in a first direction, and wherein said first support means comprises raising means for raising said first guide means to clamp said first guide means within one pallet.

9. A pallet changer system comprising:

at least one pallet for holding a workpiece;

first guide means for receiving and holding said pallet;

first support mean for supporting said first guide means;

second guide means for receiving and holding the pallet;

second support means for supporting said second guide means;

a first linear motor carried by said first guide means;

a second linear motor carried by said second guide means;

third guide means for receiving and holding said one pallet said third guide means being supported by said second support means;

a third linear motor carried by said third guide means; and wherein said one pallet is made of a conductive material so as to serve as a secondary conductor for the first linear and second linear motors for pallet changing between said first and second guide means in a first direction;

wherein said first support means comprises:

moving means for moving said first guide means in a second direction perpendicular to said first direction so as to align said first linear motor with said second linear motor or with said third linear motor.

10. A pallet changer system comprising:

at least one pallet for holding a workpiece;

first guide means for receiving and holding said pallet;

first support means for supporting said first guide means;

second guide means for receiving and holding the pallet;

second support means for supporting said second guide means;

a first linear motor carried by said first guide means;

a second linear motor carried by said second guide means;

third guide means for receiving and holding said one pallet said third guide means being supported by said second support means, and a third linear motor carried by said third guide means;

wherein said one pallet is made of a conductive material so as to serve as a secondary conductor for the first linear and second linear motors for pallet changing between said first and second guide means in a first direction wherein said first support means is a table on a vertical machining center comprising a spindlehead having a spindle for attaching a tool and movable in a third direction perpendicular to said first direction.

11. A pallet changer in accordance with claim 2, wherein each of the first, second and third guide means comprises roller means for smoothly transferring the pallet.

* * * * *